(12) United States Patent
Sovani et al.

(10) Patent No.: US 9,749,844 B1
(45) Date of Patent: Aug. 29, 2017

(54) SYSTEMS AND METHODS FOR PROVISIONING DEVICES FOR CONNECTION TO A WIRELESS NETWORK

(71) Applicant: Marvell International Ltd., Hamilton (BM)

(72) Inventors: Kedar Sovani, Pashan (IN); Amey Dattatray Inamdar, Pashan (IN)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

(21) Appl. No.: 15/079,786

(22) Filed: Mar. 24, 2016

Related U.S. Application Data

(60) Provisional application No. 62/157,733, filed on May 6, 2015.

(51) Int. Cl.
| | | |
|---|---|---|
| *H04B 5/00* | (2006.01) |
| *H04B 7/00* | (2006.01) |
| *H04W 4/00* | (2009.01) |
| *H04W 24/00* | (2009.01) |
| *H04B 1/38* | (2015.01) |
| *H04W 8/22* | (2009.01) |
| *H04W 48/16* | (2009.01) |
| *H04W 76/02* | (2009.01) |

(52) U.S. Cl.
CPC ............. *H04W 8/22* (2013.01); *H04W 48/16* (2013.01); *H04W 76/021* (2013.01)

(58) Field of Classification Search
CPC ...... H04W 4/008; H04W 40/22; H04W 48/14
USPC .................. 455/41.1, 422.1, 425, 561, 41.2; 370/254, 331, 358; 375/358
See application file for complete search history.

(56) References Cited

U.S. PATENT DOCUMENTS

| | | | | |
|---|---|---|---|---|
| 7,184,421 B1* | 2/2007 | Liu | ....................... | H04L 12/189 370/254 |
| 2002/0181637 A1* | 12/2002 | Nakabayashi | ........ | H04L 1/0002 375/358 |
| 2005/0009565 A1* | 1/2005 | Kwak | ................... | H04W 48/14 455/561 |

(Continued)

OTHER PUBLICATIONS

IEEE P802.11g/D8.2, "Part 11: Wireless LAN Medium Access Control (MAC) and Physical Layer (PHY) specifcations: Further Higher Data Rate Extension in the 2.4 GHz: Band", Apr. 2003.

(Continued)

*Primary Examiner* — William D Cumming

(57) ABSTRACT

Apparatuses and methods for provisioning devices for connection to a wireless network including an access point are provided. A first device receives a first beacon signal broadcasted by a second device. The first beacon signal includes first information indicating capabilities of the second device. The first device uses the first information to determine whether the second device is compatible with the access point. Based on a determination that the second device is compatible with the access point, the first device wirelessly transmits packets including provisioning information usable by the second device to attempt to connect to the wireless network. The first device receives one or more second beacon signals broadcasted by the second device. The one or more second beacon signals include second information indicating a status of the second device in connecting to the wireless network.

19 Claims, 8 Drawing Sheets

(56) References Cited

U.S. PATENT DOCUMENTS

| | | | | |
|---|---|---|---|---|
| 2012/0190299 A1* | 7/2012 | Takatsuka | ................ | H04B 5/00 455/41.1 |
| 2014/0171062 A1* | 6/2014 | Fallgren | ................ | H04W 40/22 455/422.1 |
| 2015/0350983 A1* | 12/2015 | Kwok | ................ | H04L 65/1069 370/331 |
| 2016/0127928 A1* | 5/2016 | McClure | ............... | H04W 4/008 455/425 |
| 2016/0345339 A1* | 11/2016 | Hori | ...................... | H04W 72/02 |

OTHER PUBLICATIONS

IEEE Std 802.11b, "Part 11: Wireless LAN Medium Access Control (MAC) and Physical Layer (PHY) specifications: Higher-Speed Physical Layer Extension in the 2.4 GHz Band", Sep. 1999.

IEEE P802.11n/D9.0, "Part 11: Wireless LAN Medium Access Control (MAC) and Physical Layer (PHY) specifications Amendment 5: Enhancements for Higher Throughput", Mar. 2009.

P802.11ac/D5.0, Jan. 2013—IEEE Standard for Information technology—Telecommunications and information exchange between systemsLocal and metropolitan area networks—Specific requirements—Part 11: Wireless LAN Medium Access Control (MAC) and Physical Layer (PHY) Specifications—Amendment 4: Enhancements for Very High Throughput for Operation in Bands below 6 GHz.

* cited by examiner

| Reserve | ntbnd | authen | attempt | attempt | attempt | attempt | attempt |
|---|---|---|---|---|---|---|---|
| 1 | 0 | 0 | 0 | 0 | 0 | 0 | 0 |

FIG. 4D

| Reserve | Reserve | Reserve | Reserve | Reserve | Reserve | Reserve | Reserve |
|---|---|---|---|---|---|---|---|
| 1 | 0 | 1 | | | | | |

FIG. 4E

| State | Information | Hexadecimal representation | Device Network Name |
|---|---|---|---|
| Unconfigured – looking for conf | 01011100-10000000 | 0x5C80 | 5C80-LightBulb |
| Configured | 10000101-01000000 | 0x8540 | 8540-LightBulb |
| Connection Successful | 10100000-00000000 | 0xA000 | A000-LightBulb |

FIG. 4F

SYSTEMS AND METHODS FOR PROVISIONING DEVICES FOR CONNECTION TO A WIRELESS NETWORK

CROSS-REFERENCE TO RELATED APPLICATIONS

This application claims priority to U.S. Provisional Patent Application No. 62/157,733, filed May 6, 2015, entitled "Improving Robustness of Sniffer-Based Provisioning by Exploiting Simultaneous uAP/Sniffer Mode," which is incorporated herein by reference in its entirety.

FIELD

The technology described herein relates generally to communication networks and more particularly to provisioning of devices in wireless local area networks.

BACKGROUND

WiFi networks, such as the Institute for Electrical and Electronics Engineers (IEEE) 802.11a, 802.11b, 802.11n or 802.11ac networks, are now commonly used within the home. In addition to providing network connectivity to computing devices such as laptop computers and smartphones, these home networks can provide connectivity to various "smart" devices in the home, such as thermostats, water heaters, light control units, etc. To gain access to the home network, a new device generally must first be "provisioned." Provisioning is a process by which a WiFi-enabled device obtains network credentials that enable secure connection to the home network. Once connected, the device can access various services, such as Internet service, through the WiFi access point (AP). As just one example, if a WiFi-enabled thermostat is connected to the home network, a home owner may use an application running on a smartphone to remotely control the temperature in his or her home via the Internet.

The description above is presented as a general overview of related art in this field and should not be construed as an admission that any of the information it contains constitutes prior art against the present patent application.

SUMMARY

Examples of a device and a method implemented in the device are provided. In an example method implemented in the first device for assisting in provisioning a second device for connection to a wireless network, the wireless network includes an access point. A first beacon signal broadcasted by the second device is received by the first device. The first beacon signal includes first information indicating one or more capabilities of the second device. The first device uses the first information to determine whether the second device is compatible with the access point of the wireless network. Based on a determination that the second device is compatible with the access point, the first device wirelessly transmits one or more packets including provisioning information usable by the second device to attempt to connect to the wireless network. Further, based on the determination that the second device is compatible with the access point, the first device receives one or more second beacon signals broadcasted by the second device. The one or more second beacon signals include second information indicating a status of the second device in connecting to the wireless network.

In another example, a first device includes a transceiver configured to receive a first beacon signal broadcasted by a second device. The first beacon signal includes first information indicating one or more capabilities of the second device. The first device further includes a processing system coupled to the transceiver and configured to process the first information to determine whether the second device is compatible with an access point of a wireless network. Based on a determination that the second device is compatible with the access point, the processing system controls the transceiver so that the first device wirelessly transmits one or more packets including provisioning information usable by the second device to attempt to connect to the wireless network. The processing system also processes second information included in one or more second beacon signals broadcasted by the second device and received via the transceiver. The second information indicates a status of the second device in connecting to the wireless network.

Also provided are a device and a method implemented in the device for provisioning the device for connection to a wireless network. In an example method implemented in a first device for provisioning the first device for connection to a wireless network, the wireless network includes an access point. A first beacon signal including first information indicating one or more capabilities of the first device is broadcasted by the first device. One or more packets wirelessly transmitted by a second device are received by the first device. The one or more packets include provisioning information usable by the first device to attempt to connect to the wireless network. The first device uses the provisioning information to attempt to connect to the wireless network. The first device broadcasts the one or more second beacon signals including second information indicating a status of the first device in connecting to the wireless network.

In another example, a first device includes a transceiver configured to broadcast a first beacon signal including first information indicating one or more capabilities of the first device. The transceiver is also configured to receive one or more packets wirelessly transmitted by a second device, the one or more packets including provisioning information usable by the first device to attempt to connect to the wireless network. The first device also includes a processing system coupled to the transceiver and configured to process the provisioning information to attempt to connect to the wireless network. The processing system is also configured to control the transceiver so that the transceiver broadcasts one or more second beacon signals including second information indicating a status of the first device in connecting to the wireless network.

BRIEF DESCRIPTION OF THE DRAWINGS

FIGS. 4A-4E depict features of an example 2-byte data structure included in a beacon signal transmitted by the second device of FIGS. 1 and 2B, according to an embodiment.

FIG. 4F is a table illustrating example service set identifiers (SSIDs) indicating a capability and/or status of the second device of FIGS. 1 and 2B, according to an embodiment.

DETAILED DESCRIPTION

In embodiments described herein, a first communication device assists in provisioning a second communication device for connection to a wireless network. For example, after determining that the second communication device is compatible with the wireless network (e.g., compatible with an access point of the wireless network), the first communication device transmits wireless provisioning information to the second communication device. The provisioning information is used by the second communication device to gain access to the wireless network, which may be, for example, a wireless local area network (WLAN), a personal area network, and/or another wireless network. Throughout the provisioning process, the second communication device broadcasts information indicating the second device's status in connecting to the wireless network. The first communication device receives the information broadcasted by the second communication device and uses the information to provide feedback to user of the first device. Such feedback may indicate, for example, the second communication device's status in connecting to the wireless network (e.g., connection in process, connection successful, connection failed and reason for failure, etc.).

Figure 1:
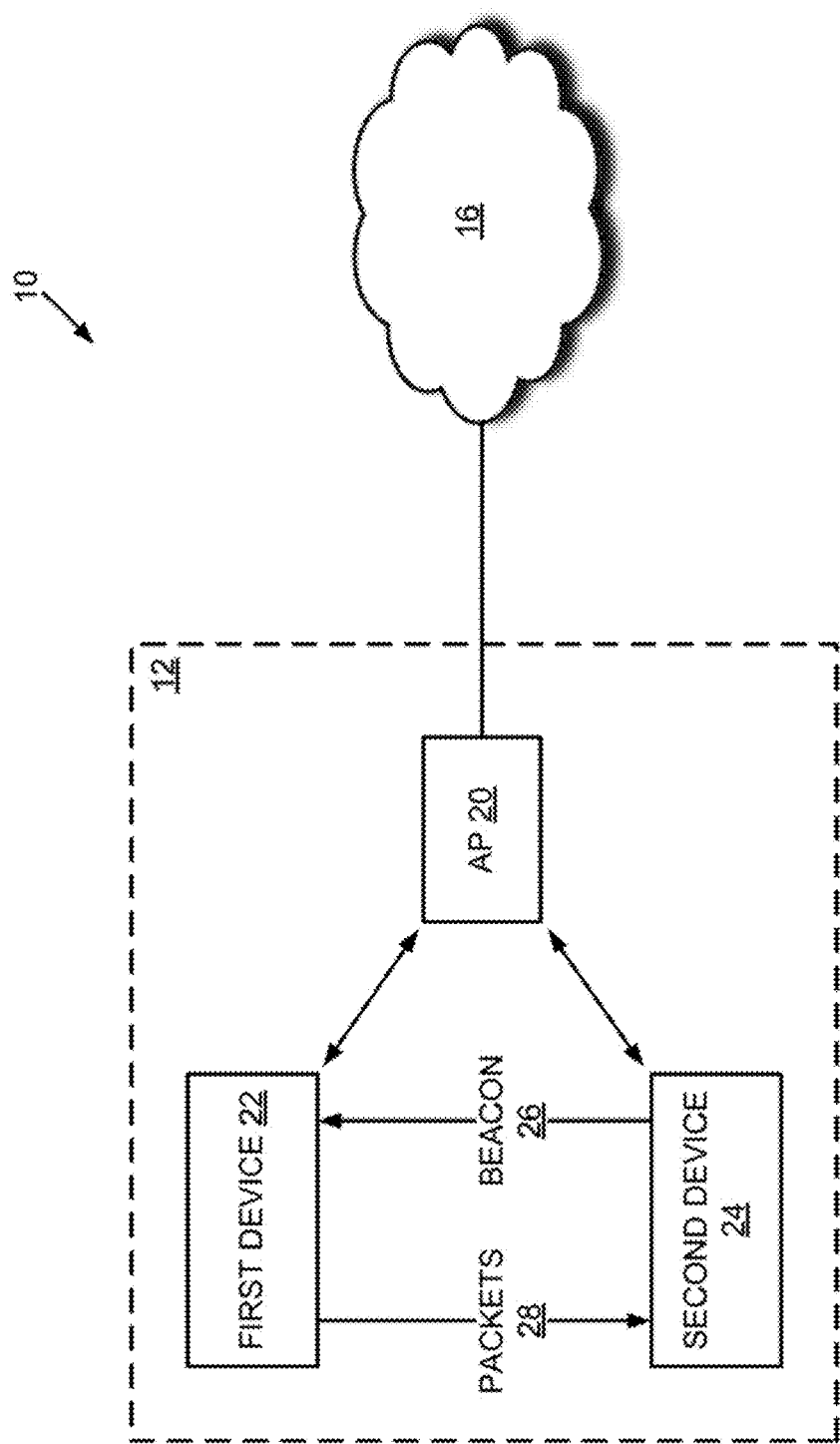
FIG. 1 is a block diagram of an example system in which home network provisioning techniques are implemented, according to an embodiment.

FIG. 1 is a block diagram of an example system 10 in which home network provisioning techniques are implemented, according to an embodiment. As illustrated in the figure, the example system 10 includes a wireless network 12 and a network 16. The wireless network 12 includes an access point (AP) 20, such as a wireless router device, for example. The network 16 is, in embodiments, a wide area network, a mobile telephony network, the Internet, an extranet, or another network. In an embodiment, the AP 20 connects directly, or via a modem or other device(s), to the network 16 via an Ethernet or other suitable connection. In the example system 10, the wireless network 12 is a WiFi network, with AP 20 being a WiFi AP. In other embodiments, however, the wireless network 12 is a different type of wireless local area network (WLAN), wireless personal area network (WPAN), or other suitable network type.

The wireless network 12 also includes a first communication device 22 and a second communication device 24. While each of the devices 22, 24 is shown in FIG. 1 as being within the wireless network 12, it is noted that each device is not a part of the wireless network 12 until the device has been properly provisioned and connects to the wireless network 12. That is, in at least some of the scenarios described below, one or more of the devices 22, 24 is/are not initially included within the wireless network 12. In some embodiments, the wireless network 12 employs provisioning procedures to allow only authorized devices access to the network 12. Typically, provisioning is a one-time process in which a device with a wireless network interface provides network credentials to the wireless network 12 (e.g., to the wireless AP 20) to allow the device to join the wireless network 12. The network credentials include, for example, a passphrase or password, according to some embodiments. The network credentials include various other data or information in embodiments.

In the system 10 of FIG. 1, the first device 22 assists in provisioning the second device 24 for connection to the wireless network 12. In embodiments, the first device 22 is a smartphone or another suitable device such as a desktop computer, a laptop computer, a tablet computer, etc. In embodiments, the second device 24 is a device (e.g., television, audio equipment, toy, lightbulb, appliance, etc.) that includes a suitable wireless network interface such as a WLAN network interface, a PAN network interface, etc. The second device 24 may be referred to herein as a WiFi-enabled device, a smart device, and/or an Internet-of-Things (IoT) device. The first device 22 is a member of the wireless network 12 and communicates with the AP 20 of the wireless network 12, in embodiments. Merely for explanatory purposes, FIG. 1 is discussed in the context of an embodiment in which the wireless network 12 is a WLAN having an AP 20, the first device 22 is a smartphone, and the second device 24 is a smart device having a wireless network interface.

As noted above, the first device 22 assists in provisioning the second device 24 for connection to the wireless network 12. According to some embodiments, the first device 22 receives, via a user interface of the first device 22, a command to begin the assisting in the provisioning of devices (e.g., smart devices, IoT devices, etc., including the second device 24). In response to receiving this command, the first device 22 begins to scan for beacon signals 26 broadcasted by devices seeking to connect to the network 12, such as the second device 24. A beacon signal, as referred to herein, comprises a repetitive wireless message that is transmitted periodically by a communication device (e.g., a communication device such as the second communication device 24). If no such beacon signals are detected by the first device 22, the first device 22 displays an error message on a display of the first device 22. The error message may indicate, for example, that there are no devices in a vicinity of the first device 22 seeking to connect to the network 12.

However, if a beacon signal 26 broadcasted by the second device 24 is detected by the first device 22, the first device 22 receives this beacon signal. According to some embodiments, the beacon signal 26 includes first information indicating one or more capabilities of the second device 24. The first information indicates, in embodiments, a frequency band (e.g., 2.4 GHz, 5 GHz, etc.) utilized by the second device 24 and/or a network protocol (e.g., one or more of IEEE 802.11b, 802.11g, 802.11n, and 802.11ac, etc.) utilized by the second device 24.

The first device 22 uses the first information to determine whether the second device 24 is compatible with the wireless network 12. The determination of whether the second device 24 is compatible with the wireless network 12 may include, in embodiments, determining whether the second device 24 is compatible with characteristics of the AP 20 of the wireless network 12. For example, the first device 22 may determine whether the frequency band utilized by the second device 24 is compatible with the AP 20 and/or determine whether network protocols utilized by the second device 24 are compatible with the AP 20. Based on a determination that the second device 24 is not compatible with the wireless network 12, the first device 22 is configured to display an error message on a display of the first device 22. The error message may indicate, for example, the reason for the second device's incompatibility with the wireless network 12 (e.g., the second device 24 utilizes a frequency band not supported by the AP 20 and/or the second device 24 utilizes network protocols not supported by the AP 20, etc.).

However, based on a determination that the second device 24 is compatible with the wireless network 12, the first device 22 wirelessly transmits one or more packets 28 including provisioning information. The second device 24 receives the one or more packets 28 and uses the provisioning information included therein in attempting to gain access to the wireless network 12. As the second device 24 attempts to connect to the wireless network 12, the second device 24 contemporaneously broadcasts beacon signals 26 including second information. The second information indicates a status of the second device 24 in connecting to the wireless network 12. In embodiments, the first device 22 uses the second information to generate an indication of the status of the second device 24 that is displayed on the display of the first device 22. For example, the first device 22 may use the second information to determine (i) that the second device 24 was unable to successfully connect to the wireless network 12, and/or (ii) a reason for the second device's failure to connect to the wireless network 12. The error message displayed on the display of the first device 22 may provide an indication of this reason. Conversely, the second information may indicate that the second device 24 was able to connect to the wireless network 12 successfully. Thus, it is noted that when the second device 24 is attempting to connect to the wireless network 12, the second device 24 is broadcasting beacons 26 indicating that the second device 24 is attempting to connect to the wireless network 12. These beacons 26 may further indicate a status of the connection progress (e.g., number of connection attempts, errors that have occurred, etc.). When the second device 24 has successfully connected to the wireless network 12 or has failed in connecting to the wireless network 12, the second device 24 broadcasts beacons 26 indicating the second device's success or failure in connecting to the wireless network 12.

In conventional systems, the first communication device 22 transmits provisioning information to the second communication device 24 but does not receive beacon signals 26 indicating capabilities and/or a connection status of the second device 24. Thus, the first device 22 may transmit provisioning information even though the second device 24 is incompatible with the AP 20. For example, the second device 24 may utilize a frequency band (e.g., 2.4 GHz, 5 GHz, etc.) and/or network protocol (e.g., IEEE 802.11b, 802.11g, 802.11n, and 802.11ac, etc.) that is not supported by the AP 20, thus making the second device 24 incompatible with the AP 20. When the second device 24 and the AP 20 are incompatible, provisioning of the second device 24 fails. Further, in conventional systems, where the first device 22 does not receive information on the second device's connection status to the wireless network 12, there is no reliable way for a user of the first device 22 to know if the second device 24 received the provisioning information correctly. In conventional systems, when the second device 24 fails to connect to the wireless network 12, there is also no way for the user of the first device 22 to know what went wrong (e.g., incorrect passphrase, AP 20 not reachable, etc.).

In contrast to these conventional systems, in the approaches of the instant disclosure, the second device 24 broadcasts beacon signals 26 indicating the second device's capabilities and/or status in connecting to the wireless network 12. The first device 22 receives the beacon signals 26 and uses information included in the beacon signals 26 in various ways. For example, in embodiments, the first device 22 transmits the provisioning information to the second device 24 only after first determining that the second device 24 is compatible with the wireless network 12. The first device 22 makes this determination based on the information included in the beacons 26. Further, during the provisioning process, the first device 22 uses the information of the beacon signals 26 to provide feedback to the user of the first device 22, with the feedback indicating the second device's status in connecting to the wireless network 12.

Additionally, in the approaches of the instant disclosure, the first device 22 transmits the provisioning information to the second device 24 while still being connected to the AP 20 (e.g., without having to disconnect from the AP 20). This is in contrast to conventional systems, which commonly require a first device to (i) disconnect from the AP, (ii) then connect to a second device, and (iii) then transmit provisioning information to the second device. Performing the entire provisioning process without the first device 22 ever having to disconnect from the AP 20, as enabled under the approaches of the instant disclosure, is advantageous because it allows the device 22 to maintain its connection to the network 16 (e.g., the Internet) and provides a better user experience. For example, a user need not perform the process of disconnecting the first device 22 from the AP 20 and then connecting to the second device 24, which can be complicated and/or time consuming for the user.

As described above, the first device 22 is configured to transmit provisioning information to the second device 24. In embodiments, the first device 22 transmits provisioning information to the second device 24 by wirelessly transmitting a plurality of multicast packets 28, where the provisioning information is encoded in media access control (MAC) address fields or other fields of the packets 28. In embodiments, the second device 24 receives the packets 28 by operating in a "sniffer" mode in which the second device 24 is configured or programmed to recognize or detect the packets 28 transmitted by the first device 22. In some embodiments, the second device 24 captures all packets transmitted on a selected wireless channel. In an embodiment, before provisioning, the second device 24 operating in the sniffer mode is not connected to the network 12 or any of the devices in the network 12 but can, nonetheless, intercept traffic in the wireless network 12. In some embodiments, the packets 28 appear as normal multicast traffic to other communication devices in the network 12 and/or to devices outside the network 12.

Once the second device 24 receives the provisioning information from the first device 22, the second device 24 switches from the sniffer mode into a normal operation mode. In the normal operation mode, the second device 24 attempts to connect to the wireless network 12 using the provisioning information received from the first device 22. As noted above, as the second device 24 attempts to connect to the wireless network 12, the second device 24 contemporaneously broadcasts beacon signals 26 indicating a status of the second device 24 in connecting to the wireless network 12. In some embodiments, the provisioning information includes one of or any suitable combination of two or more of a passphrase, a network identifier (e.g., network ID, etc.), a Basic Service Set Identifier (BSSID), an IP address, etc. As an illustrative example, the second device 24 establishes a connection with the AP 20 using a BSSID and a passphrase obtained by the first device 22 from the packets 28.

Figure 2B:
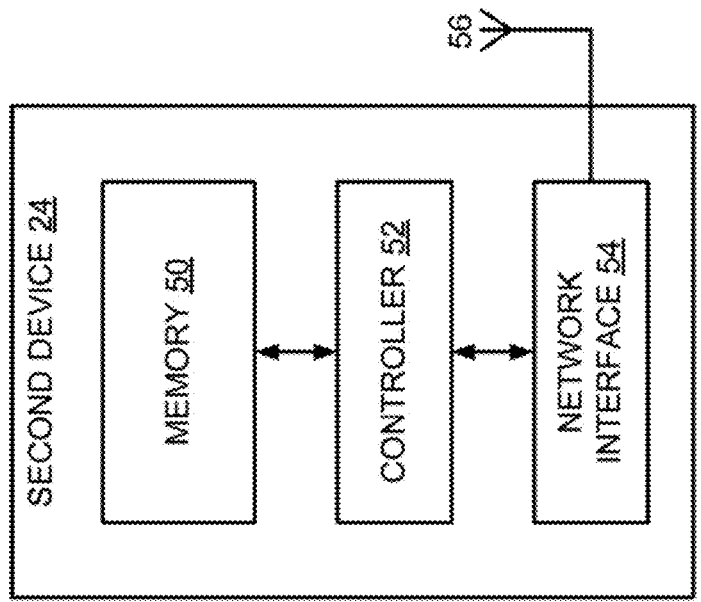
FIG. 2B is a block diagram showing the second device of FIG. 1 in more detail, according to an embodiment.
Figure 2A:
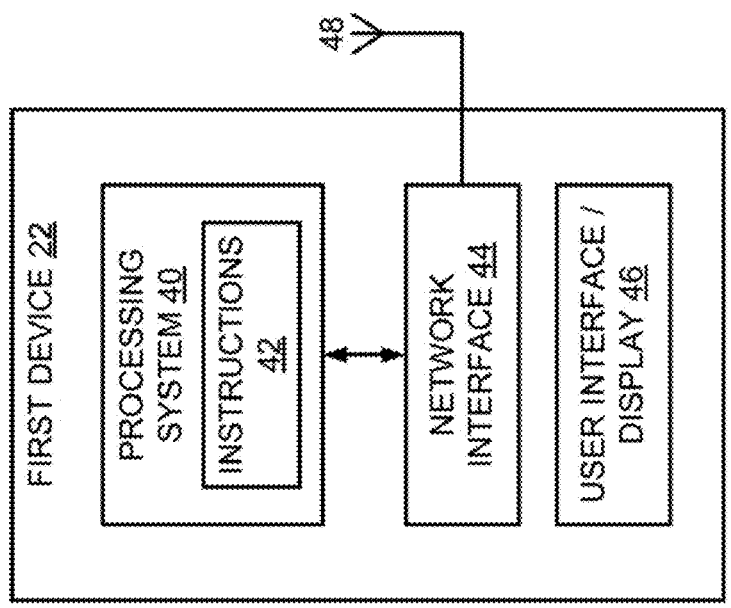
FIG. 2A is a block diagram showing the first device of FIG. 1 in more detail, according to an embodiment.

FIGS. 2A and 2B are block diagrams showing the first and second devices 22, 24 of FIG. 1, respectively, in more detail. In the example embodiment of FIG. 2A, the device 22 includes a network interface 44, a processing system 40 (e.g., a central processing unit (CPU) or other data processor including one or more processor cores, etc.), and one or more antennas 48. The network interface 44 is configured to support WiFi network communications. In one embodiment, for example, the network interface 44 is configured to generate WiFi packets, to cause the generated WiFi packets to be transmitted via antenna(s) 48, and to process (e.g., demodulate and decode) WiFi packets received via antenna(s) 48. The processing system 40 communicates with the network interface 44 to support the provisioning techniques described herein.

In some embodiments, the network interface 44 and/or the processing system 40 include(s) one or more physical processors (not shown in FIG. 2A) that implement the operations corresponding to the first device 22 that are described below in connection with FIGS. 3 and 5. In one embodiment, one or more of the physical processors are hardware processors, such as integrated circuits (e.g., ASICs, programmable logic devices, etc.) or a collection of discrete hardware components, for example. In another embodiment, one or more of the physical processors is/are configured to read and execute software or firmware instructions 42 stored on a tangible, non-transitory, computer-readable memory (e.g., a magnetic disk, optical disk, RAM, ROM, flash memory, etc.). In some embodiments, the software or firmware instructions 42 include machine-readable instructions that, when executed by the processor(s), cause the processor(s) to perform some or all of the operations of the device 22 that are described below in connection with FIGS. 3 and 5. Such operations include, for example, (i) receiving a first beacon signal broadcasted by the second device 24, the first beacon signal including first information indicating one or more capabilities of the second device 24, (ii) using the first information to determine whether the second device 24 is compatible with the access point 20 of the wireless network 12, and (iii) performing operations based on a determination that the second device 24 is compatible with the access point 20. In some embodiments, the network interface 44 is integrated within the processing system 40. In other embodiments, the network interface 44 and processing system 40 are distinct (e.g., separate integrated circuits).

The first device 22 further includes a user interface/display 46, in embodiments. In embodiments where the first device 22 is a smartphone or tablet computer, the user interface/display 46 comprises a touchscreen that is configured to display information and receive input via a user (e.g., via the user's touch or via an input device such as a stylus, etc.). In embodiments, the user interface/display 46 is used to receive various inputs and commands from the user, such as an input or command to begin in the assisting of the provisioning of the second device 24. The user interface/display 46 is also used to display various information to the user of the first device 22, in embodiments. Such information may indicate (i) a status of the second device 24 in connecting to the wireless network 12, and (ii) an absence of IoT devices in a vicinity of the first device 22, among other information.

In the example embodiment of FIG. 2B, the second device 24 includes a network interface 54, a controller 52, a memory 50, and one or more antennas 56. The network interface 54 is configured to support WiFi network communications. In one embodiment, for example, the network interface 54 is configured to generate WiFi packets, to cause the generated WiFi packets to be transmitted via antenna(s) 56, and to process (e.g., demodulate and decode) WiFi packets received via antenna(s) 56. The controller 52 communicates with the network interface 54 to support the provisioning techniques described herein. In some embodiments, the network interface 54 and/or controller 52 include(s) one or more physical processors (not shown in FIG. 2B) that implement the operations corresponding to the second device 24 that are described below in connection with FIG. 3-5. Such operations include, for example, (i) broadcasting a first beacon signal including first information indicating one or more capabilities of the second device 24, (ii) receiving one or more packets wirelessly transmitted by the first device 22, the one or more packets including provisioning information, (iii) using the provisioning information to attempt to connect to the wireless network 12, and (iv) broadcasting one or more second beacon signals including second information indicating a status of the second device 24 in connecting to the wireless network 12. In some embodiments, the network interface 54 is integrated within controller 52. In other embodiments, the network interface 54 and controller 52 are distinct (e.g., separate integrated circuits).

Figure 3:
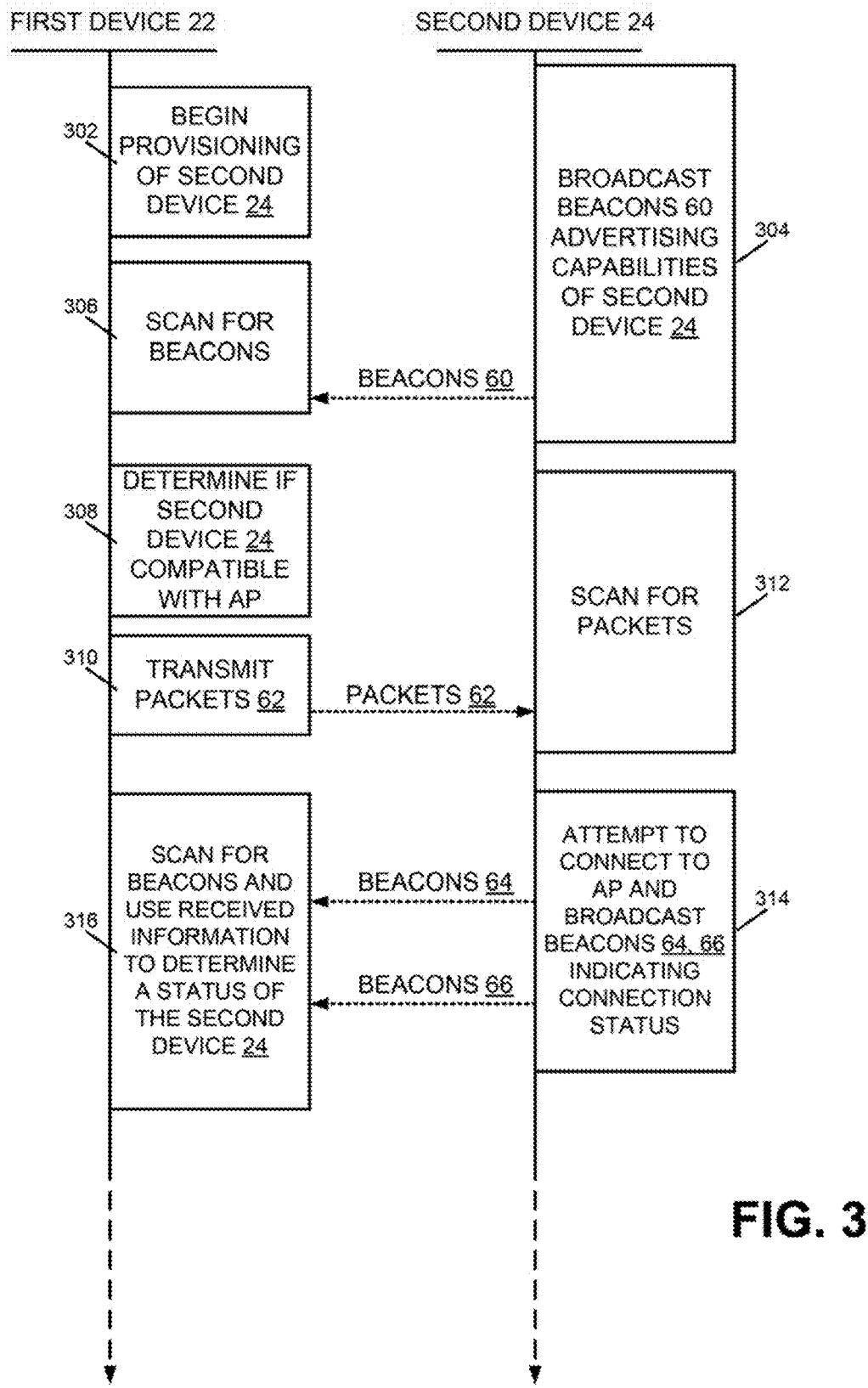
FIG. 3 is a sequence diagram corresponding to the example system and devices of FIGS. 1-2B, according to an embodiment.

FIG. 3 is a sequence diagram corresponding to the example system and devices of FIGS. 1, 2A, and 2B, according to an embodiment. In FIG. 3, a first (left-most) vertical timeline corresponds to the first device 22, and a second (right-most) vertical timeline corresponds to the second device 24, with time advancing in the downward direction. The sequence diagram of FIG. 3 begins at a time when the second device 24 has not yet been provisioned for connectivity to the wireless network 12. At the beginning of the sequence diagram, the first device 22 may already be provisioned and connected to the wireless network 12, in embodiments.

At process 302 of the sequence diagram, the first device 22 begins the provisioning of the second device 24. The first device 22 begins the provisioning, in embodiments, based on a command received at the user interface 46 of the first device 22. For example, the first device 22 may execute an application (e.g., an "app" or "mobile app"), and a user input to the application may initiate the provisioning of the second device 24. At process 306, the first device 22 scans one or more channels for beacons (e.g., beacons broadcasted by IoT devices). At process 304, the second device 24 broadcasts beacons 60 advertising one or more capabilities of the second device 24. Such capabilities include, for example, a frequency band utilized by the second device 24 and/or a network protocol utilized by the second device 24. Because the first device 22 is scanning for beacons (e.g., as shown at process 306) during the period of time in which the second device 24 is broadcasting the beacons 60, the first device 22 receives the beacons 60. In embodiments, after receiving the beacons 60, the first device 22 stops scanning for beacons (e.g., temporarily stops scanning for beacons). In other embodiments, the first device 22 continues to scan for beacons despite having received the beacons 60.

Using information included in the beacons 60 (e.g., information indicating the one or more capabilities of the second device 24), at process 308, the first device 22 determines if the second device 24 is compatible with the AP 20 of the wireless network 12. The determination at process 308 includes, in embodiments, (i) determining whether the frequency band utilized by the second device 24 is compatible with the AP 20, and/or (ii) determining whether the network protocol(s) utilized by the second device 24 is compatible with the AP 20. Based on a determination that the second device 24 is compatible with the AP 20, at process 310, the first device 22 wirelessly transmits one or more packets 62 including provisioning information usable by the second device 24 to attempt to connect to the wireless network 12. The information included in the one or more packets 62 may or may not be encrypted. At process 312, the second device 24 scans for packets and receives the packets 62 transmitted from the first device 22. In embodiments, the second device 24 receives the packets 62 including the provisioning information by operating in the above-described sniffer mode in which the second device 24 is configured or programmed to recognize or detect the packets 62 transmitted by the first device 22.

At process 314, the second device 24 attempts to connect to the AP 20 of the wireless network 12. Throughout the connection process at 314, the second device 24 broadcasts beacons 64, 66 indicating a status of the second device 24 in connecting to the AP 20. For example, when the second device 24 is in the process of attempting to connect to the AP 20, the second device 24 may transmit the beacons 64 indicating (i) that the device 24 is attempting to connect to the wireless network 12, and (ii) a status of the device 24 in connecting (e.g., found pattern on a channel, configuration received, etc.). Further, for example, when the second device 24 has successfully connected to the AP 20 or has failed in doing so, the second device 24 may broadcast the beacons 66 indicating the second device's success or failure in connecting to the AP 20.

At process 316, the first device 22 scans for beacons and receives the beacons 64, 66 broadcasted by the second device 24. As noted above, such beacons 64, 66 include information indicating a status of the second device in connecting to the AP 20. At process 316, the first device uses this information to provide feedback to user of the first device 22. Such feedback may indicate, for example, the second device's status in connecting to the wireless network (e.g., connection in process, connection successful, connection failed and reason for failure, etc.). Feedback that may be provided to the user of the first device 22 is explained in further detail below with reference to FIG. 5.

Although the illustration of FIG. 3 depicts the first device 22 as scanning for beacons only during particular periods of time (e.g., as shown at 306, 316), in embodiments, the first device 22 scans for beacons in a continuous or near-continuous manner. For example, in embodiments, the first device 22 continuously or intermittently scans for beacons during regular operation and continues to perform such scans during, throughout, and/or after the timeline of the sequence diagram of FIG. 3. Likewise, although the illustration of FIG. 3 depicts the second device 24 as broadcasting beacons only during particular periods of time (e.g., as shown at 304, 314), in embodiments, the second device 24 broadcasts beacons in a continuous or near-continuous manner. For example, in embodiments, the second device 24 continuously or intermittently broadcasts beacons during time periods in which it is attempting to connect to the wireless network 12 and continues to perform such broadcasting during, throughout, and/or after the timeline of the sequence diagram of FIG. 3.

Figure 4A:
Figure 4A:

FIGS. 4A-4E depict features of an example 2-byte data structure included in a beacon signal transmitted by the second device 24 of FIGS. 1 and 2B, according to an embodiment. As described above with reference to FIGS. 1-3, in embodiments, the second device 24 transmits beacon signals that advertise capabilities of the second device 24 and/or a status of the second device 24 in connecting to the wireless network 12. In embodiments, beacons transmitted by the second device 24 include this information in a 2-byte data structure. An example 2-byte data structure comprising sixteen bits (e.g., bit 0-bit 15) is illustrated in FIG. 4A.

In embodiments, three bits (e.g., bits 0, 1, and 2) of the 2-byte data structure indicate a status of the second device 24 in connecting to the wireless network 12. This status is also referred to herein as a "state" of the second device 24. With the three bits, eight different device states may be indicated (e.g., each of the combinations 000, 001, 010, 100, 011, 110, 101, 111 may be associated with a state of the second device 24). In the example of FIGS. 4A-4E, however, bits 0, 1, and 2 of the 2-byte data structure are used to indicate five different states of the second device 24. These five states are described in further detail below. The other thirteen bits of the 2-byte data structure (e.g., bits 3-15) are used to indicate additional information relating to the second device 24. The additional information represented by a bit or bits of the other thirteen bits is dependent on the state of the device 24 indicated by bits 0, 1, and 2, in embodiments. For instance, a value of the bit 9 of the 2-byte data structure (i) indicates whether the second device 24 is configured to use a 5 GHz frequency band when bits 0, 1, and 2 indicate that the device 24 is in a first state (e.g., a "not configured" state), and (ii) indicates whether an authentication error has occurred when the bits 0, 1, and 2 indicate that the device 24 is in a second state (e.g., a "configuration received" state). This is explained in further detail below.

Figure 4B:
Figure 4B:

As indicated above, three bits (e.g., bits 0, 1, and 2) of the 2-byte data structure indicate a status of the second device 24 in connecting to the wireless network 12. In an embodiment, when bits 0, 1, and 2 have respective values of "001," this indicates that the second device 24 is in a first state, "unconfigured." In the unconfigured state, the second device 24 has not been provisioned, is not connected to the network 12, and is not currently searching for configuration information. FIG. 4B illustrates what different bits of the 2-byte data structure represent when the second device 24 is in the unconfigured state. As illustrated in this figure, the bits 0, 1, and 2 of the data structure have respective values of "001," thus indicating that the second device 24 is in the unconfigured state.

In the example of FIG. 4B, bits 3-6 indicate whether the device 24 supports certain network protocols. Specifically, bit 3 indicates whether the second device 24 supports the IEEE 802.11b network protocol (e.g., a value of "1" for bit 3 indicates that 802.11b is supported by the second device 24, and a value of "0" for bit 3 indicates that 802.11b is not supported by the second device 24, or vice versa). Likewise, bit 4 indicates whether the second device 24 supports the IEEE 802.11g network protocol, bit 5 indicates whether the second device 24 supports the IEEE 802.11n network protocol, and bit 6 indicates whether the second device 24 supports the IEEE 802.11ac network protocol. Bits 8 and 9 indicate whether the device 24 supports certain frequency bands. Specifically, bit 8 indicates whether the second device 24 supports the 2.4 GHz frequency band, and bit 9 indicates whether the second device 24 supports the 5 GHz frequency band. In the example of FIG. 4B, bits 7 and 10-16 are "reserved," and thus do not convey any information. In embodiments, the reserved bits are set equal to zero. It is noted that the bits marked as reserved in FIG. 4B may be used to convey additional information in other embodiments. To illustrate the example scheme of FIG. 4B, if the second device 24 supports the IEEE 802.11b, g, and n network protocols and the 2.4 GHz frequency band, bits 0-15 of the 2-byte data structure would have respective values "00111100-10000000."

Figure 4C:
Figure 4C:

In an embodiment, when bits 0, 1, and 2 have respective values of "010," this indicates that the second device 24 is in a second state, "unconfigured, looking for configuration information." In the second state, the second device 24 has not been provisioned and is not connected to the network 12, but the second device 24 is searching for configuration information. FIG. 4C illustrates what different bits of the 2-byte data structure represent when the second device 24 is in the "unconfigured, looking for configuration information" state. As illustrated in this figure, the bits 0, 1, and 2 of the data structure have respective values of "010," thus indicating that the second device 24 is in the "unconfigured, looking for configuration information" state. Bits 3-6 indicate whether the device 24 supports certain network protocols. Specifically, bit 3 indicates whether the second device 24 supports the IEEE 802.11b network protocol, bit 4 indicates whether the second device 24 supports the IEEE 802.11g network protocol, bit 5 indicates whether the second device 24 supports the IEEE 802.11n network protocol, and bit 6 indicates whether the second device 24 supports the IEEE 802.11ac network protocol. Bits 8 and 9 indicate whether the device 24 supports certain frequency bands. Specifically, bit 8 indicates whether the second device 24 supports the 2.4 GHz frequency band, and bit 9 indicates whether the second device 24 supports the 5 GHz frequency band. In the example of FIG. 4C, bits 7 and 10-16 are "reserved." To illustrate the example scheme of FIG. 4C, if the second device 24 supports the IEEE 802.11b, g, and n network protocols and the 2.4 GHz frequency band, bits 0-15 of the 2-byte data structure would have respective values "01011100-10000000."

In an embodiment, when bits 0, 1, and 2 have respective values of "100," this indicates that the second device 24 is in a third state, "configuration received." In the third state, the second device 24 has received provisioning information from the first device 22 but has not yet successfully connected to the wireless network 12. FIG. 4D illustrates what different bits of the 2-byte data structure represent when the second device 24 is in the "configuration received" state. As illustrated in this figure, the bits 0, 1, and 2 of the data structure have respective values of "100," thus indicating that the second device 24 is in the "configuration received" state. Bits 3-7 indicate a number of connection attempts that the second device 24 has made. In embodiments, these bits represent a binary value that can be converted to a decimal value indicating the number of connection attempts. For example, if bits 3-7 have respective values "00000," this indicates that zero connection attempts have been made. Values "00001" indicate one connection attempt, values "00010" indicate two connection attempts, values "00011" indicate three connection attempts, values "00100" indicate four connection attempts, and so on. Bit 8 indicates "network not found," bit 9 indicates "authentication error" (e.g., incorrect passphrase or password), and bit 10 indicates that a DHCP error has occurred. In the example of FIG. 4D, bits 11-15 are "reserved." To illustrate the example scheme of FIG. 4D, if the second device 24 is in the "configuration received" state, has made five connection attempts, and is currently unable to join the network 12 due to an incorrect passphrase (e.g., authentication error), bits 0-15 of the 2-byte data structure would have respective values "10000101-01000000."

In an embodiment, when bits 0, 1, and 2 have respective values of "101," this indicates that the second device 24 is in a fourth state, "connection successful." In the fourth state, the second device 24 has successfully connected to the wireless network 12. FIG. 4E illustrates what different bits of the 2-byte data structure represent when the second device 24 is in the "connection successful" state. As illustrated in this figure, the bits 0, 1, and 2 of the data structure have respective values of "101," thus indicating that the second device 24 is in the "connection successful" state. In the example of FIG. 4E, bits 3-15 are "reserved."

It is noted that additional other states of the second device 24 are represented by the 2-byte data structure, in embodiments. For instance, in an embodiment, when bits 0, 1, and 2 have respective values of "111," this indicates that the second device 24 is in a fifth state, "found pattern on a given channel." Frequency bands (e.g., 2.4 GHz, 5 GHz, etc.) utilized in wireless networks include a number of different channels. For example, the 2.4 GHz frequency band includes twelve channels, in embodiments. When operating in the above-described sniffer mode, the second device 24 stays on a given channel for a period of time, looking for patterns. When a pattern is found, the second device 24 may lock on the given channel and continue to sniff for packets on the channel. In embodiments, when bits of the 2-byte data structure indicate that the second device 24 is in the "found pattern on a given channel" state, other bits of the 2-byte data structure indicate the channel number on which the second device 24 is locked and/or sniffing for packets.

In embodiments, the 2-byte data structure advertising the capabilities and/or status of the second device 24 is included in an Information Element (IE) of a beacon transmitted by the second device 24. In other embodiments, the 2-byte data structure is included in a Service Set Identifier (SSID) of a beacon transmitted by the second device 24. In embodiments where the SSID is used to convey the 2-byte data structure, the 2-byte data structure can be encoded in a particular format, such as hexadecimal, base64, etc. To illustrate this, reference is made to FIG. 4F.

In FIG. 4F, a column 402 illustrates example SSIDs that may be included in beacons broadcasted by the second device 24. These SSIDs advertise the capabilities and/or status of the second device 24. For example, to advertise that the second device 24 (i) has a status "unconfigured, looking for configuration" (e.g., as shown in a first row of a column 408), and (ii) supports the 2.4 GHz frequency band and the 802.11b, g, and n network protocols, the 2-byte data structure has values "01011100-1000000." These values are shown in a column 406 of the table, in the first row. This particular 2-byte data structure may be represented in hexadecimal format as "0x5C80," as shown in a column 404 of the table. The SSID "5C80-Lightbulb" shown in the column 402 includes this hexadecimal number. Thus, when the first device 22 receives beacons from the second device 24 including the SSID "5C80-Lightbulb," the first device 22 can process the SSID to determine the values of the 2-byte data structure and the corresponding status and/or capabilities of the second device 24.

The table of FIG. 4F includes additional other examples of advertising information in an SSID included in a beacon signal. It is noted that the approach of FIG. 4F is merely an example, and that various other approaches are used in other embodiments. For example, in embodiments, the last few bytes of the SSID are used to advertise information. Additionally, in embodiments, the SSID has a common prefix that the provisioning application on the first device 22 looks for to identify devices with which it is concerned. It is further noted that the particular 2-byte data structure described herein is merely an example. In other embodiments, the second device 24 broadcasts beacons including information on the capabilities and/or status of the second device 24, with the information being specified in various other format that are different from the above-described 2-byte data structure.

Figure 5:
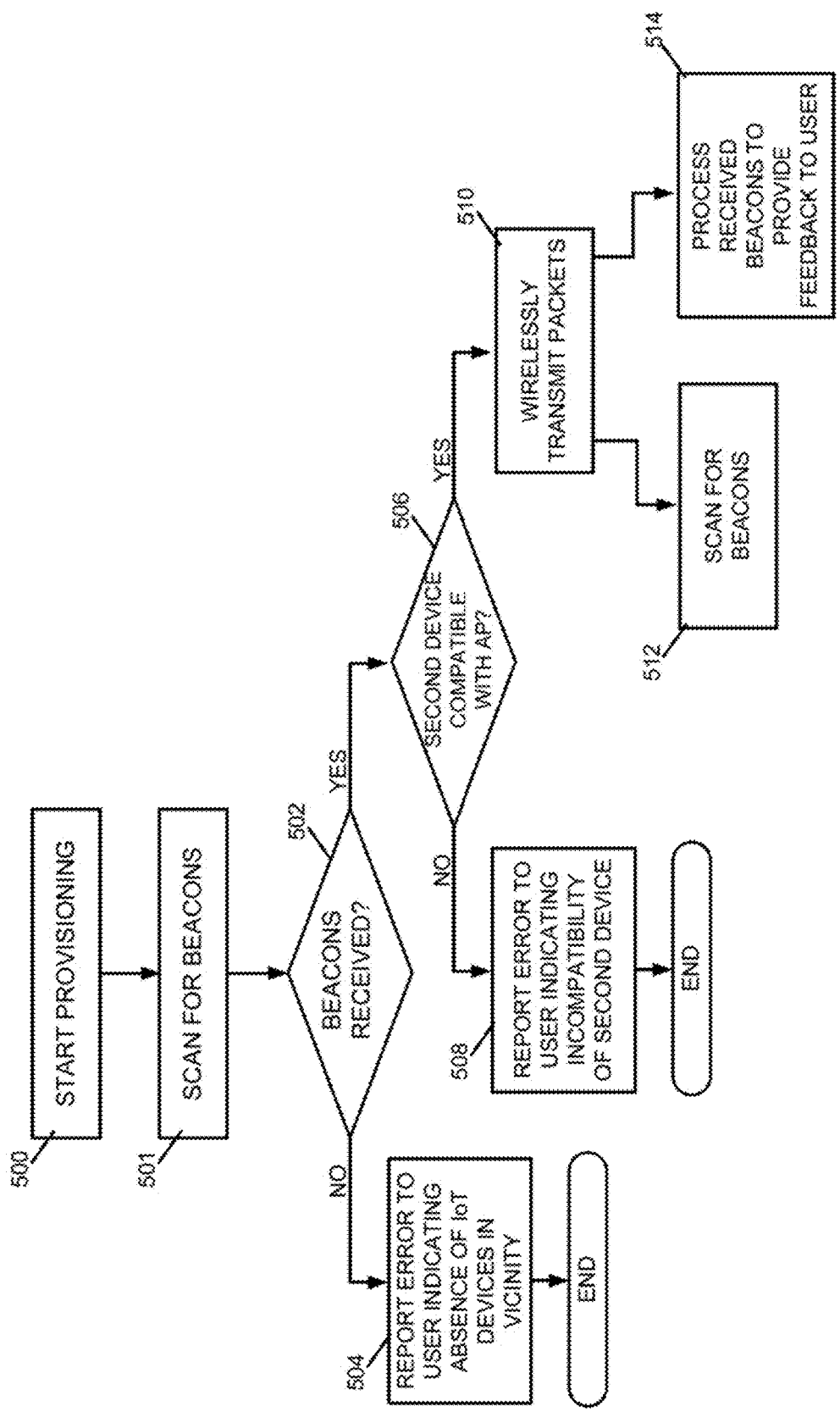
FIG. 5 depicts an example algorithm, implemented by a first device, for provisioning a second device for connection to a wireless network, according to an embodiment.

FIG. 5 depicts an example algorithm, implemented by the first device 22, for provisioning the second device 24 for connection to the wireless network 12, according to an embodiment. The algorithm of FIG. 5 and other aspects of the approaches described herein enable an improved user experience as compared to conventional approaches. The user experience is improved, for example, because of the feedback that is provided to the user of the first device 22. Such feedback is described in further detail below with reference to FIG. 5. At 500, the user of the first device 22 starts the provisioning of the second device 24 using a provisioning application that is executed on the first device 22. At 501, the first device 22 scans the network 12 and looks for the presence of beacons (e.g., beacons including IEs and/or SSIDs with information indicating capabilities and/or a connection status of nearby IoT devices) to determine if there is a nearby IoT device (e.g., a listening device) to be provisioned. If no such beacons are detected at 502, at 504, an error message is reported to the user (e.g., via a display of the first device 22). The error message indicates, in embodiments, that there is an absence of IoT devices requiring provisioning in the vicinity of the first device 22.

If beacons are detected at 502, this indicates that the second device 24 requiring provisioning has been found. The first device 22 determines the capabilities of the second device 24 from the IEs and/or SSIDs of the received beacons, and at 506 determines if the second device 24 is compatible with the AP 20 of the wireless network 12. Specifically, at 506, the first device 22 (i) determines whether the second device 24 operates in the same frequency band (e.g., 2.4 GHz, 5 GHz, etc.) as the AP 20, and (ii) determines whether the second device 24 is capable of connecting with the IEEE 802.11 network protocol supported by the AP 20. If the capabilities of the second device 24 do not match those of the AP 20, then at 508, an error message is reported to the user. The error message indicates, in embodiments, the incompatibility of the second device 24 with the AP 20. In embodiments, the error message provides specific details on the incompatibility (e.g., "Device to be provisioned operates in 2.4 GHz, which is incompatible with the 5.0 GHz AP," etc.).

If the capabilities of the second device 24 match those of the AP 20, then at 510, the first device 22 starts the sniffer-based provisioning process. Specifically, in embodiments, the first device 22 begins to wirelessly transmit packets including provisioning information that is usable by the second device 24 to attempt to connect to the wireless network 12. While the second device 24 attempts to connect to the network 12, the provisioning application executed on the first device 22 scans for beacons at 512. Such beacons indicate the status of the second device 24 in connecting to the wireless network 12. At 514, the first device 22 processes the received beacons to provide feedback to the user of the first device 22.

In embodiments, when the second device 24 reaches the state "configuration received" (e.g., as described above with reference to FIG. 4D), the provisioning application executed on the first device 22 reports to the user that the second device 24 is currently making connection attempts, among other information (e.g., a number of attempts, etc.). Further, when the second device 24 is in the "configuration received" state, if the second device 24 experiences errors (e.g., network not found, authentication error, DHCP error, etc.), information on the error that occurred is reported to the user via the provisioning application of the first device 22, in embodiments. The provisioning application may further prompt the user of the first device 22 to take corrective action, in embodiments. If the second device 24 reaches the "connection successful" state (e.g., as described above with reference to FIG. 4E), the provisioning application of the first device 22 reports to the user that the second device 24 has successfully connected to the network 12. It is noted that the above-described feedback provided to the user of the first device 22 is only an example, and that other feedback is provided to the user in other embodiments.

Figure 6:
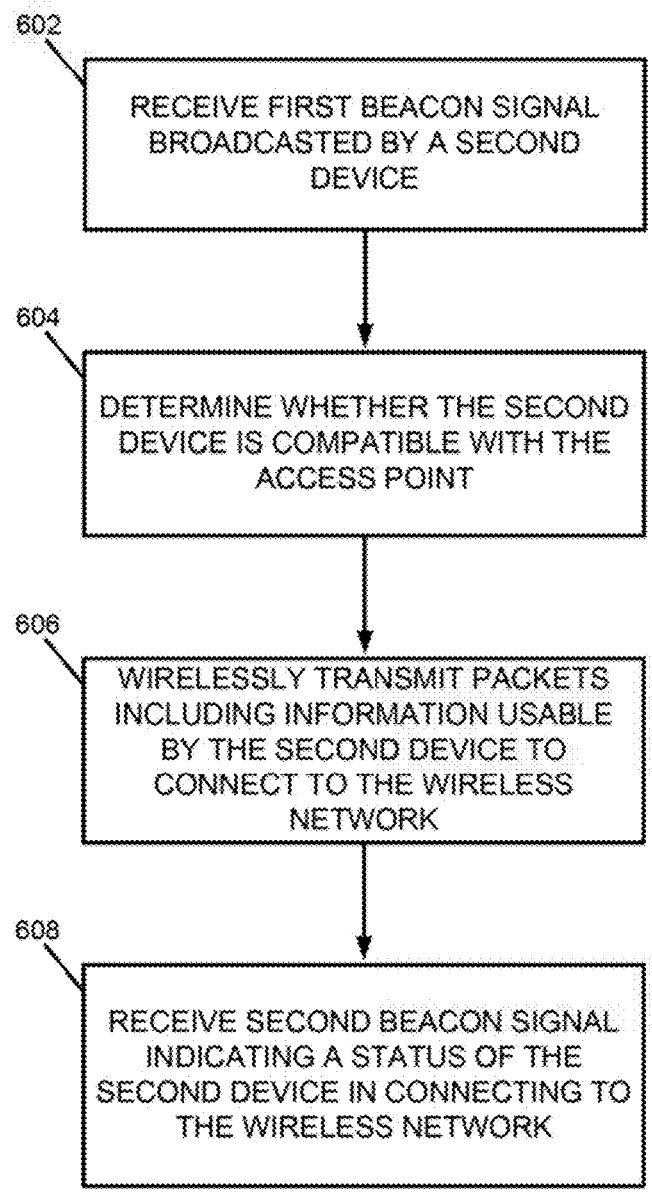
FIG. 6 is a flowchart depicting operations of an example method, implemented in a first device, of assisting in provisioning a second device for connection to a wireless network, according to an embodiment.

FIG. 6 is a flowchart depicting operations of an example method, implemented in a first device (e.g., the device 22 of FIGS. 1-3), of assisting in provisioning a second device (e.g., the device 24 of FIGS. 1-3) for connection to a wireless network (e.g., the wireless network 12 of FIG. 1), according to an embodiment. The wireless network includes an access point (e.g., the access point 20 of FIG. 1). At 602, a first beacon signal broadcasted by the second device is received by the first device. The first beacon signal includes first information indicating one or more capabilities of the second device. At 604, the first device uses the first information to determine whether the second device is compatible with the access point of the wireless network. At 606, based on a determination that the second device is compatible with the access point, the first device wirelessly transmits one or more packets including provisioning information usable by the second device to attempt to connect to the wireless network. Further, at 608, based on the determination that the second device is compatible with the access point, the first device receives one or more second beacon signals broadcasted by the second device. The one or more second beacon signals include second information indicating a status of the second device in connecting to the wireless network.

Figure 7:
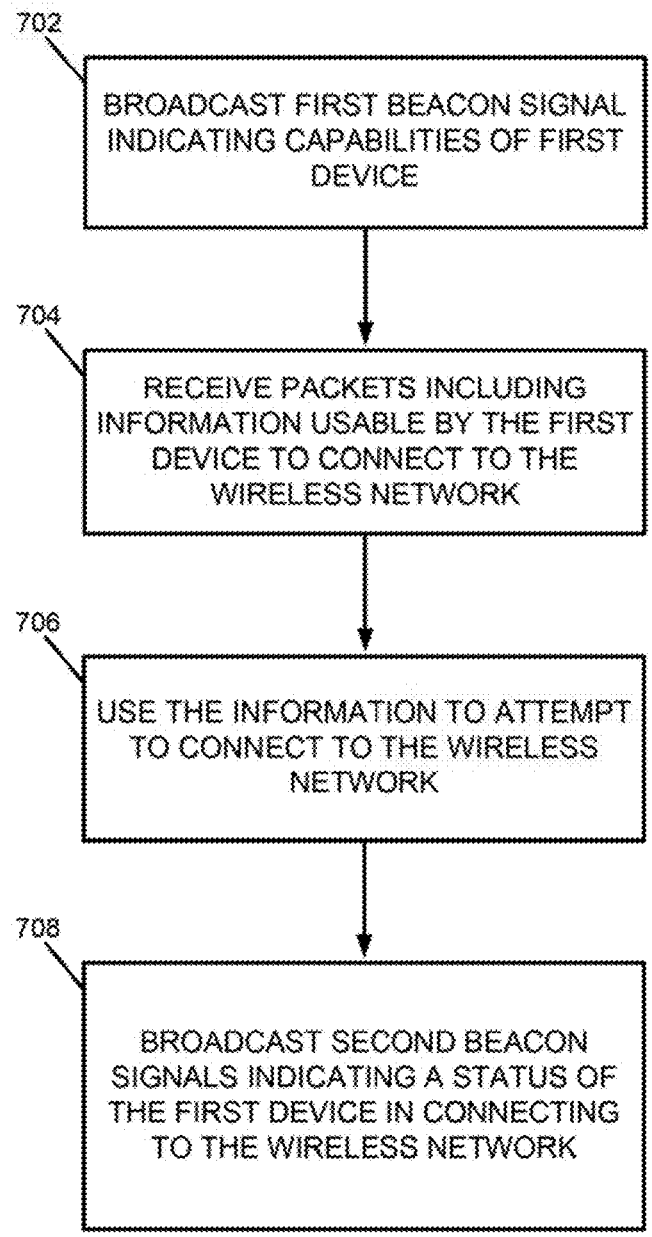
FIG. 7 is a flowchart depicting operations of an example method, implemented in a first device, of provisioning the first device for connection to a wireless network, according to an embodiment.

FIG. 7 is a flowchart depicting operations of an example method, implemented in a first device (e.g., the device 24 of FIGS. 1-3), of provisioning the first device for connection to a wireless network (e.g., the wireless network 12 of FIG. 1), according to an embodiment. The wireless network includes an access point (e.g., the access point 20 of FIG. 1). At 702, a first beacon signal including first information indicating one or more capabilities of the first device is broadcasted by the first device. At 704, one or more packets wirelessly transmitted by a second device (e.g., the device 22 of FIGS. 1-3) are received by the first device. The one or more packets include provisioning information usable by the first device to attempt to connect to the wireless network. At 706, the first device uses the provisioning information to attempt to connect to the wireless network. At 708, the first device broadcasts the one or more second beacon signals including second information indicating a status of the first device in connecting to the wireless network.

This application uses examples to illustrate the invention. The patentable scope of the invention may include other examples.

What is claimed is:

1. A method, implemented in a first device, of assisting in provisioning a second device for connection to a wireless network, the wireless network comprising an access point, the method comprising:

receiving a first beacon signal broadcasted by the second device, the first beacon signal including first information indicating one or more capabilities of the second device;

using the first information to determine whether the second device is compatible with the access point of the wireless network; and based on a determination that the second device is compatible with the access point, wirelessly transmitting one or more packets including provisioning information usable by the second device to attempt to connect to the wireless network, and receiving one or more additional beacon signals broadcasted by the second device, the one or more additional beacon signals including second information indicating a status of the second device in connecting to the wireless network, wherein the broadcasting of the one or more additional beacon signals by the second device comprises, when the first device is attempting to connect to the wireless network, the second device broadcasting beacons indicating that the first device is attempting to connect to the wireless network; and when the first device has successfully connected to the wireless network or has failed in connecting to the wireless network, the second device broadcasting beacons indicating the first device's success or failure in connecting to the wireless network.

2. The method of claim 1, further comprising:
using the second information to generate an indication of the status of the second device; and
displaying the indication on a display of the first device.

3. The method of claim 1, further comprising:
based on a determination that the second device is not compatible with the access point, displaying an error message on a display of the first device, the error message indicating the incompatibility of the second device with the access point.

4. The method of claim 1, further comprising:
receiving, via a user interface of the first device, a command to begin the assisting in the provisioning;
responsive to receiving the command, scanning for beacon signals broadcasted by Internet of Things (IoT) devices; and
based on a determination that beacon signals broadcasted by IoT devices were not detected, displaying an error message on a display of the first device, the error message indicating an absence of IoT devices in a vicinity of the first device.

5. The method of claim 1,
wherein the first information comprises a portion of a first service set identifier (SSID), the first SSID being included in a beacon of the first beacon signal; and
wherein the second information comprises a portion of a second SSID, the second SSID being included in a beacon of the one or more additional beacon signals.

6. The method of claim 1,
wherein the first information is included in a first information element (IE), the first IE being included in a beacon of the first beacon signal; and
wherein the second information is included in a second IE, the second IE being included in a beacon of the one or more additional beacon signals.

7. The method of claim 1, wherein the determination of whether the second device is compatible with the access point of the wireless network comprises:
using the first information to determine a frequency band utilized by the second device; and
determining whether the frequency band utilized by the second device is compatible with the access point.

8. The method of claim 1, wherein the determination of whether the second device is compatible with the access point of the wireless network comprises:
using the first information to determine a network protocol utilized by the second device; and
determining whether the network protocol utilized by the second device is compatible with the access point.

9. The method of claim 1, further comprising:
using the second information to determine (i) that the second device was unable to successfully connect to the wireless network, and (ii) a reason for the second device's failure to connect to the wireless network; and
displaying an error message on a display of the first device that indicates the reason.

10. A first device comprising:
a transceiver configured to receive a first beacon signal broadcasted by a second device, the first beacon signal including first information indicating one or more capabilities of the second device; and
a processing system coupled to the transceiver and configured to
process the first information to determine whether the second device is compatible with an access point of a wireless network, and
based on a determination that the second device is compatible with the access point, (i) control the transceiver so that the first device wirelessly transmits one or more packets including provisioning information usable by the second device to attempt to connect to the wireless network, and (ii) process second information included in one or more additional beacon signals broadcasted by the second device and received via the transceiver, the second information indicating a status of the second device in connecting to the wireless network, wherein the broadcasting of the one or more additional beacon signals by the second device comprises, when the first device is attempting to connect to the wireless network, the second device broadcasts beacons indicating that the first device is attempting to connect to the wireless network; and when the first device has successfully connected to the wireless network or has failed in connecting to the wireless network, the second device broadcasts beacons indicating the first device's success or failure in connecting to the wireless network.

11. The first device of claim 10,
wherein the first information comprises a portion of a first service set identifier (SSID), the first SSID being included in a beacon of the first beacon signal; and
wherein the second information comprises a portion of a second SSID, the second SSID being included in a beacon of the one or more additional beacon signals.

12. The first device of claim 10,
wherein the first information is included in a first information element (IE), the first IE being included in a beacon of the first beacon signal; and
wherein the second information is included in a second IE, the second IE being included in a beacon of the one or more additional beacon signals.

13. A method, implemented in a first device, of provisioning the first device for connection to a wireless network, the wireless network comprising an access point, the method comprising:
broadcasting a first beacon signal including first information indicating one or more capabilities of the first device;

receiving one or more packets wirelessly transmitted by a second device, the one or more packets including provisioning information usable by the first device to attempt to connect to the wireless network;

using the provisioning information to attempt to connect to the wireless network; and broadcasting one or more additional beacon signals including second information indicating a status of the first device in connecting to the wireless network, wherein the broadcasting of the one or more additional beacon signals comprises, when the first device is attempting to connect to the wireless network, broadcasting beacons indicating that the first device is attempting to connect to the wireless network; and when the first device has successfully connected to the wireless network or has failed in connecting to the wireless network, broadcasting beacons indicating the first device's success or failure in connecting to the wireless network.

14. The method of claim 13, wherein the first information comprises a portion of a first service set identifier (SSID), the first SSID being included in a beacon of the first beacon signal; and wherein the second information comprises a portion of a second SSID, the second SSID being included in a beacon of the one or more additional beacon signals.

15. The method of claim 13, wherein the first information is included in a first information element (IE), the first IE being included in a beacon of the first beacon signal; and wherein the second information is included in a second IE, the second IE being included in a beacon of the one or more additional beacon signals.

16. The method of claim 13, wherein the one or more capabilities of the device comprise (i) a frequency band utilized by the first device, and (ii) a network protocol utilized by the first device.

17. The method of claim 1, wherein the beacons indicating the first device's failure to connect to the wireless network further indicate a reason for the first device's failure to connect.

18. A first device comprising:

a transceiver configured to broadcast a first beacon signal including first information indicating one or more capabilities of the first device, and receive one or more packets wirelessly transmitted by a second device, the one or more packets including provisioning information usable by the first device to attempt to connect to the wireless network; and a processing system coupled to the transceiver and configured to process the provisioning information to attempt to connect to the wireless network, and control the transceiver so that the transceiver broadcasts one or more additional beacon signals including second information indicating a status of the first device in connecting to the wireless network, wherein the broadcasting of the one or more additional beacon signals comprises, when the first device is attempting to connect to the wireless network, the transceiver broadcasts beacons indicating that the first device is attempting to connect to the wireless network; and when the first device has successfully connected to the wireless network or has failed in connecting to the wireless network, the transceiver broadcasts beacons indicating the first device's success or failure in connecting to the wireless network.

19. The first device of claim 18, wherein the first information comprises a portion of a first service set identifier (SSID), the first SSID being included in a beacon of the first beacon signal; and wherein the second information comprises a portion of a second SSID, the second SSID being included in a beacon of the one or more additional beacon signals.

* * * * *